(12) United States Patent
Daneshfar

(10) Patent No.: US 6,270,559 B1
(45) Date of Patent: Aug. 7, 2001

(54) BREATHE CLEAN AIR WITH AQUA AIR-FILTER

(76) Inventor: Khossrow Daneshfar, 1609 Cherry Pl., Escondido, CA (US) 92027

( * ) Notice: Subject to any disclaimer, the term of this patent is extended or adjusted under 35 U.S.C. 154(b) by 0 days.

(21) Appl. No.: 09/213,652

(22) Filed: Dec. 15, 1998

(51) Int. Cl.[7] ............ B01D 45/08; B01D 47/02
(52) U.S. Cl. ............. 96/262; 96/331; 96/350; 96/351; 96/358
(58) Field of Search ............. 96/331, 351, 352, 96/353, 354, 235, 245, 262, FOR 146, 329, 348, 350, 355, 358, 360; 95/226, 152

(56) References Cited

U.S. PATENT DOCUMENTS

| | | | |
|---|---|---|---|
| 1,390,096 | * 9/1921 | DiSante | 96/331 |
| 4,553,991 | * 11/1985 | Barsacq | 55/472 |
| 5,833,739 | * 11/1998 | Klatte et al. | 95/136 |
| 5,871,562 | * 2/1999 | Culoso | 95/26 |

FOREIGN PATENT DOCUMENTS 6-142429 * 5/1994 (JP) ............. 96/FOR 146

* cited by examiner

*Primary Examiner*—David A. Simmons
*Assistant Examiner*—Robert A. Hopkins

(57) ABSTRACT

The upper cylinder with several holes perforated in the base is inserted and bolted to the lower cylinder with several holes perforated in the upper part of the wall of the larger cylinder. A circular damper plate is placed on top of the upper cylinder to prevent splashing of the water. A holding plate accommodating the two cylinders is placed into the heating and air conditioning system, in the spot where the conventional mesh filters are usually placed. Then water and paraffin is poured into the cylinders. The incoming air flows through the water and paraffin bath and traps all dust, dust mites, pollutants, bacteria and particulate matter. A water reservoir maintains the correct water level in the cylinders, by connecting an air pipe as a sensor and a water pipe as a water supply.

1 Claim, 11 Drawing Sheets

PERSPECTIVE OF AQUA AIR-FILTER DEVICE WITH COMPONENTS SHOWN SEPARATELY.

PERSPECTIVE OF AQUA AIR-FILTER DEVICE WITH COMPONENTS SHOWN SEPARATELY.

PERSPECTIVE OF WATER RESERVOIR TANK A.

PERSPECTIVE OF DAMPER B.

PERSPECTIVE OF UPPER CYLINDER C.

FRONT VIEW OF UPPER CYLINDER C.

PERSPECTIVE OF LOWER CYLINDER D.

FRONT VIEW OF LOWER CYLINDER D.

PERSPECTIVE OF AQUA AIR-FILTER DEVICE READY FOR INSERTION INTO MOUNT PLATE.

CUT-AWAY DRAWING OF AQUA AIR-FILTER DEVICE WITH ALL COMPONENTS ASSEMBLED.

PERSPECTIVE OF COMPONENTS OF AQUA AIR-FILTER DEVICE READY FOR INSTALLATION IN A STANDARD HEATING AND AIRCONDITIONIONG SYSTEM.

PERSPECTIVE OF AQUA AIR-FILTER DEVICE INSTALLED IN A STANDARD HEATING AND AIRCONDITIONING SYSTEM.

BREATHE CLEAN AIR WITH AQUA AIR-FILTER

BACKGROUND OF THE INVENTION

1. Field of the Invention

This invention relates to the filtration of dust, bacteria and other pollutants from the air in residential and commercial heating and air conditioning systems.

The air flow is designed to pass through a water and paraffin bath for more effective filtration.

2. Description of the Prior Art

At the present time standard air filters used in conventional heating and airconditioning systems do not thoroughly filter all dust particles, bacteria and pollutants.

This is because the standard filters are mesh materials and are therefore porous, allowing dust, dust mites, bacteria, fungus and microbes to escape through the tiny holes. The waste from microscopic dust mites cling to dust particles that exist in the air flow.

The contaminated air carrying airborne particulate matter is circulated throughout the home or office areas every time the heating or cooling system runs. This in turn causes hay fever, allergies, asthma, headaches, nasal congestion, sinus and other respiratory problems.

The Aqua Air-Filter solves these problems by passing the incoming air through a water and paraffin bath, thus removing all airborne particulates and impurities and allowing people to breath normally and efficiently.

The Aqua Air-Filter is a simple, inexpensive device that can protect the health, comfort and welfare of all human beings.

Besides the obvious health benefits, clean air helps maintain a cleaner home environment.

The Aqua Air-Filter is simple, inexpensive to manufacture, significantly more effective compared to conventional filters, extremely durable and requires minimal maintenance. Above all, it does not require a free standing housing. Instead, it becomes an integral part of the existing forced air heating and airconditioning system.

Here is how my invention works:

The Aqua Air-Filter consists of two cylindrical containers, the upper small one placed inside the lower larger one.

The smaller container is perforated at the bottom. It also has a hole at the center of the base to allow a bolt to pass through and connect the two containers by the use of a nut.

The larger lower container has holes all around the upper part of the container.

Water is then poured into the upper container which flows through the holes and fills the lower container as well. The water level is always maintained below the level of the holes in the lower cylinder. The correct water level is maintained with the help of an exterior water reservoir.

A thin layer of liquid paraffin is added to the water to enhance the trapping of air particulate matter and pollutants. The paraffin also reduces the rate of evaporation.

All the various parts of the device may be made of any material suitable for the purpose, with a preference to use good quality plastic for residential, and stainless steel for industrial usage.

The two cylinders and the damper could be designed in a rectangular shape as well.

The heating or airconditioning fan starts in the furnace, reducing the air pressure and creating a vacuum.

The polluted and dust-filled air now starts to flow through the holes in the lower cylinder and then flows down through the walls of the two cylinders, all the way to the bottom and then up through the holes in the upper cylinder.

The incoming air is now rising and passing through the water and the upper layer which is the paraffin.

This process allows the trapping of all dust, dust mites, airborne bacteria and other particulate matter that are in the incoming air. All these pollutants attach to the water and paraffin molecules in the liquid bath. The air filtration is significantly superior when compared to existing conventional filtration.

Total air filtration remains an unfulfilled dream for mankind. Some inventors in the past have tried to solve this problem in various ways but have been unable to combine all three of the following elements into one filtration system:

that filters thoroughly that is an integral part of the heating and airconditioning system that is simple, easy to install and cheap to maintain

PRIOR ART PATENTS

U.S. Pat. No. 4,172,865

Ernest Steicy Oct. 30, 1979

This prior patented room air cleaner draws ambient air beneath a freely swinging baffle suspended above a liquid bath. As the air passes beneath the baffle, it is directed toward the surface of the bath. The momentum of the solid particles within the ambient air carries the particles into the bath where they are trapped and maintained. The air is then drawn through a filter element and subsequently exhausted into the room.

This prior patented invention directs air to the SURFACE of the bath which can trap only a portion of the particulate matter in the incoming air that touches the surface. The rest of the air which does not contact the surface continues along with all its bacteria and impurities into the room and the filtration is only partial and incomplete. Also, this prior patented device is very large, complex and expensive to manufacture because it is self standing, requires its own power and is not a part of the standard heating and airconditioning system.

SUMMARY OF THE INVENTION

The Aqua Air-Filter passes the incoming air through a water and paraffin bath and thus removes all airborne particulate matter and bacteria unlike conventional filters that allow a significant amount to pass through the porous filters.

The invention is simple, inexpensive to manufacture, significantly more effective compared to conventional filters, extremely durable and requires minimal maintenance.

The invention does not require a free standing housing, and with an easy, one-time installation, becomes an integral part of the existing forced air heating and airconditioning system.

DRAWINGS FOLLOWED BY A DESCRIPTION OF PREPARED EMBODIMENTS

AQUA AIR-FILTER DEVICE FIG. 1

The Aqua Air-Filter Device is made up of the following components:
 Water Reservoir Tank FIG. 2
 Pipe A1 for Air FIG. 2
 Pipe A2 for Water FIG. 2
 Damper B FIG. 3
 Upper Cylinder C FIG. 4
 Lower Cylinder D FIG. 5
 Mount Plate FIG. 8
Water Reservoir Tank FIG. 2

The Water Reservoir Tank stores the back-up water in order to maintain proper water level in the device.

The cap at the top of the tank seals and stops air leakage.

Pipe A1, for air, is inserted into the water reservoir tank all the way up so that the end is above the water level of the water reservoir tank.

The other end of Pipe A1 is inserted into the small side pocket that is attached to the wall of the Upper Cylinder C.

Pipe A2, for water, is attached to the base of the water reservoir tank while the other end of Pipe A2 is inserted all the way down into the small side pocket that is attached to the wall of the upper cylinder.

Figure 1:
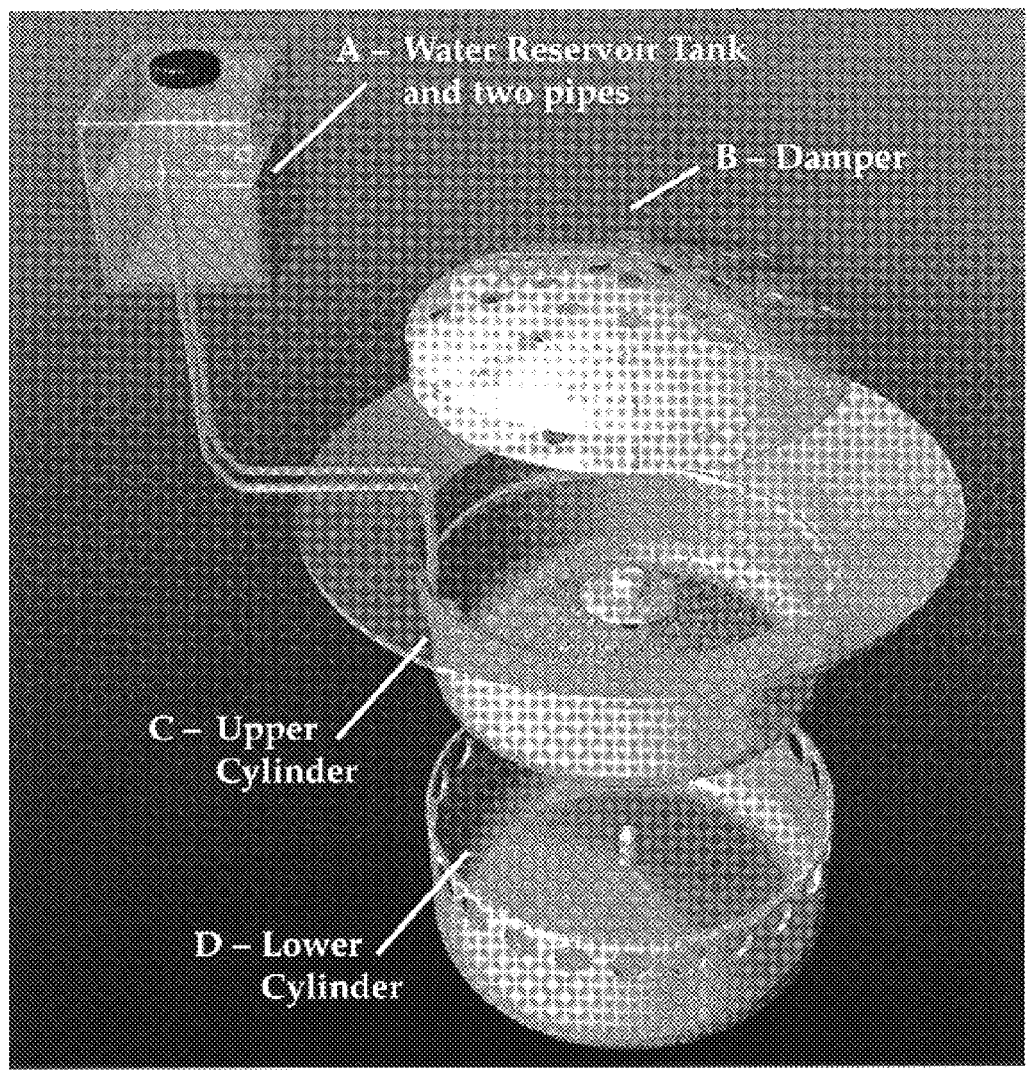
FIG. 1: Perspective of Aqua Air-Filter Device with components shown separately.
Figure 2:
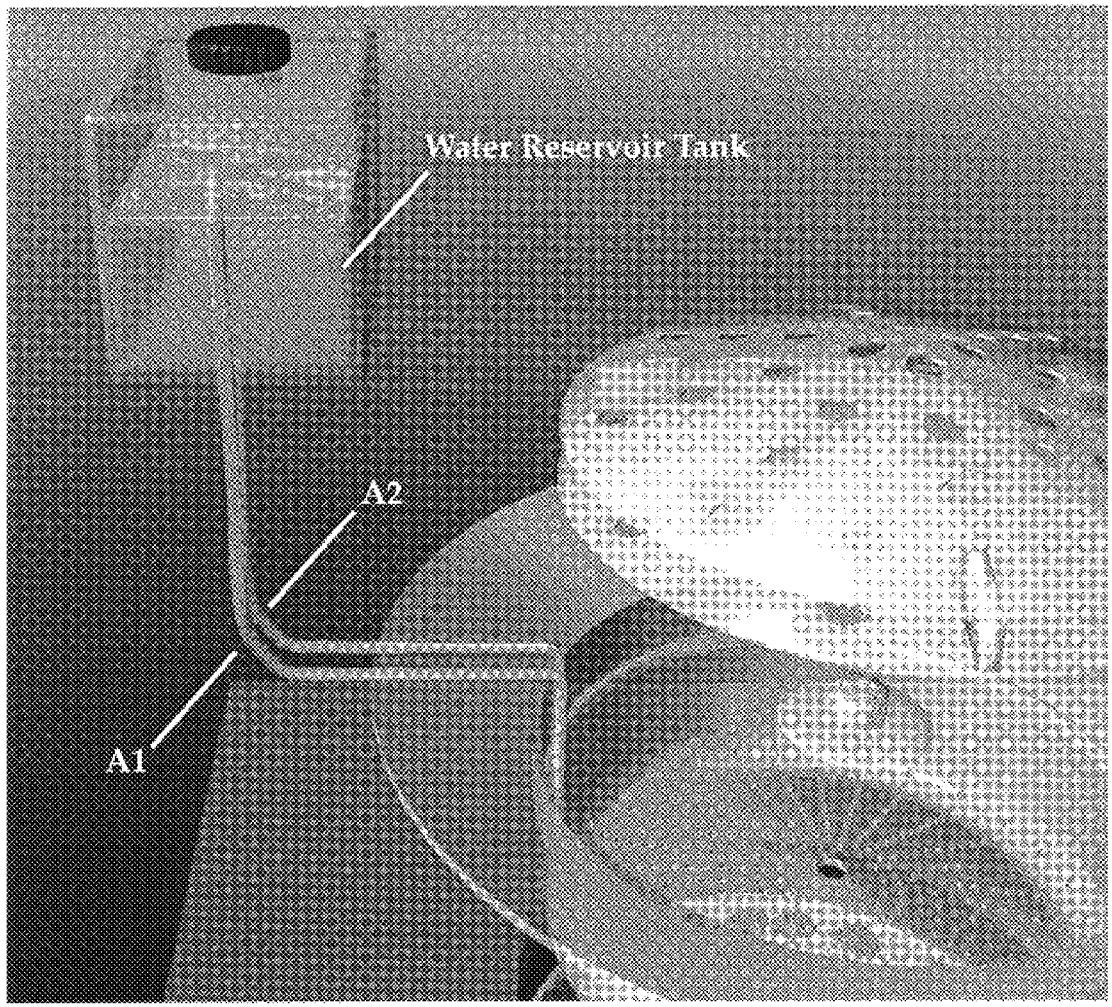
FIG. 2: Perspective of Water Reservoir Tank, A

Pipe A1 For Air FIG. 2

Allows intake of air from the device into the water reservoir each time the water level in the device drops.

Pipe A2 For Water FIG. 2

Allows the flow of water from the water reservoir into the device, each time the air enters the water reservoir. The flow of water automatically stops when the water level rises in the device and chokes off the air flow into the water reservoir.

Figure 3:
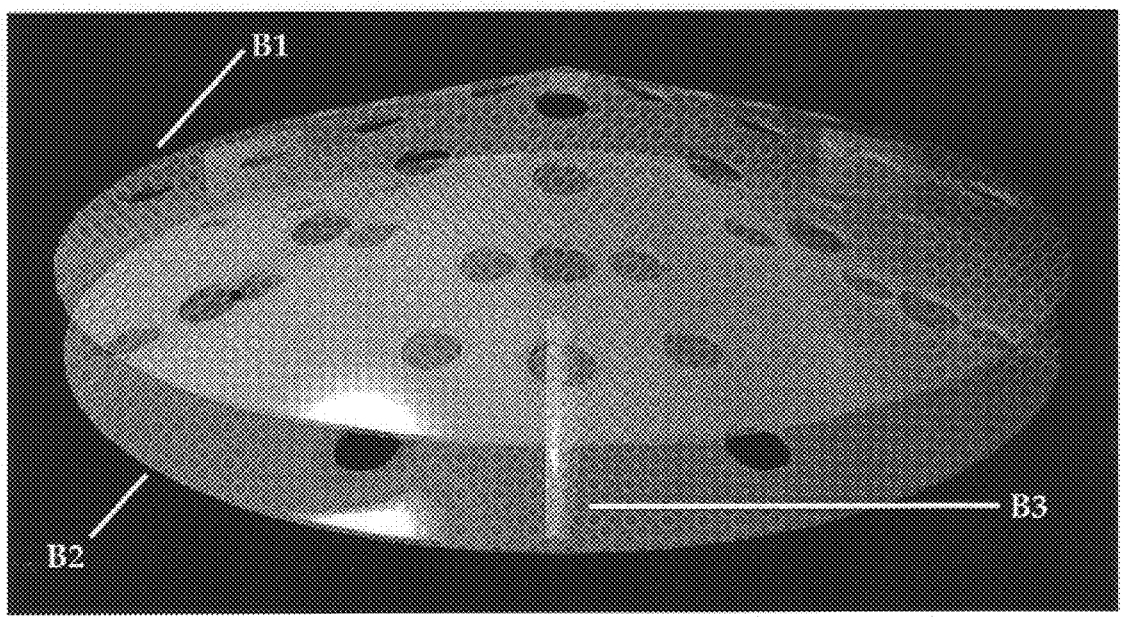
FIG. 3: Perspective of Damper, B

Damper B FIG. 3

The Damper B sits in the groove in the upper part of the Upper Cylinder C. Its function is to prevent the splashing of water as it rises vertically from the base of the Aqua Air-Filter device.

The Damper B is comprised of two cone-shaped units B1 and B2 that are attached to each other by three connecting pieces B3. Each cone-shaped unit is perforated with a series of hole that are offset. This allows the clean air to flow upward and at the same time block the splashing of water.

The cone-shape allows the splashed water to flow back into the system.

Figure 4:
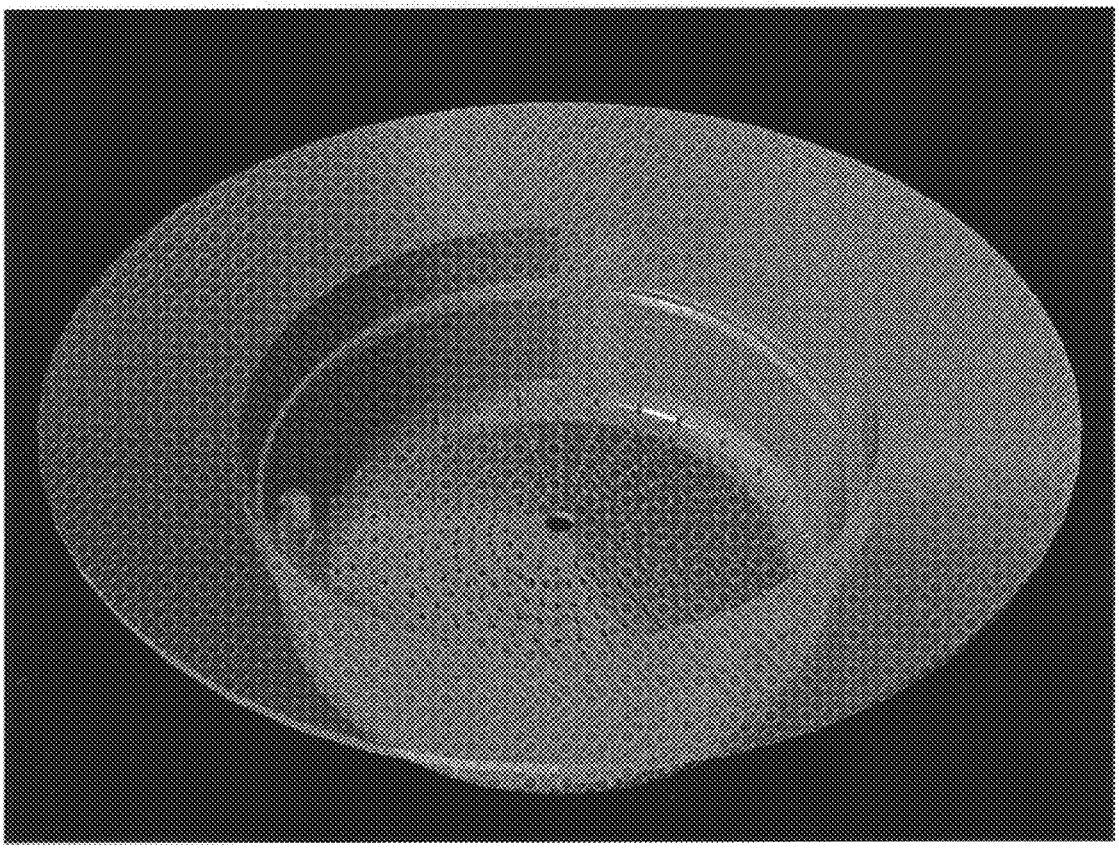
FIG. 4: Perspective of Upper Cylinder, C
Figure 5:
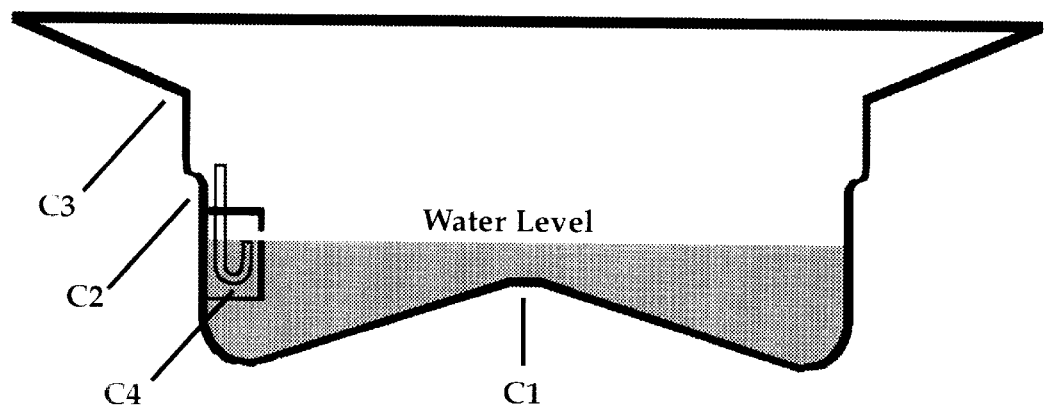
FIG. 5: Front view of Upper Cylinder, C

Upper Cylinder C FIG. 4 and FIG. 5

C1: The base of the Upper Cylinder C is perforated with as many holes as needed to allow the flow of air. The conical shape of the base enhances the flow of incoming unfiltered air. The hole in the center of the base allows attachment to the Lower Cylinder D by way of a nut that is attached to the bolt coming through from the Lower Cylinder D.

C2: This section of the Upper Cylinder is designed to hold the Damper B at the correct level.

C3: The wide sloping Lip C3 of the Upper Cylinder C is designed to facilitate surplus water to flow back into the system.

C4: Side Pocket C4 is attached to the wall of the Upper Cylinder C. It is designed to house Pipe A1 and Pipe A2 which come down from the Water Reservoir Tank A for the purpose of maintaining the proper water level in the device. Due to the flow of forced air through the water in the system, a constant turbulence is created at the water level of the system. This turbulence would cause erratic and frequent triggering of the water intake from the Reservoir Water Tank A.

By designing and incorporating a Side Pocket C4, the turbulence problem is resolved. The Side Pocket C4 creates an isolated, undisturbed space in which the water level is constantly tranquil. This, in turn, allows precise triggering of water intake from the Water Reservoir Tank A.

Pipe A1, for air flow, coming down from the Water Reservoir Tank A, enters the Side Pocket C4 and ends in a U shape that turns all the way up to the desired water level. Pipe A2, for water flow, coming down from the Water Reservoir Tank A, enters the Side Pocket C4 and rests at the base of the Side Pocket C4.

Figure 6:
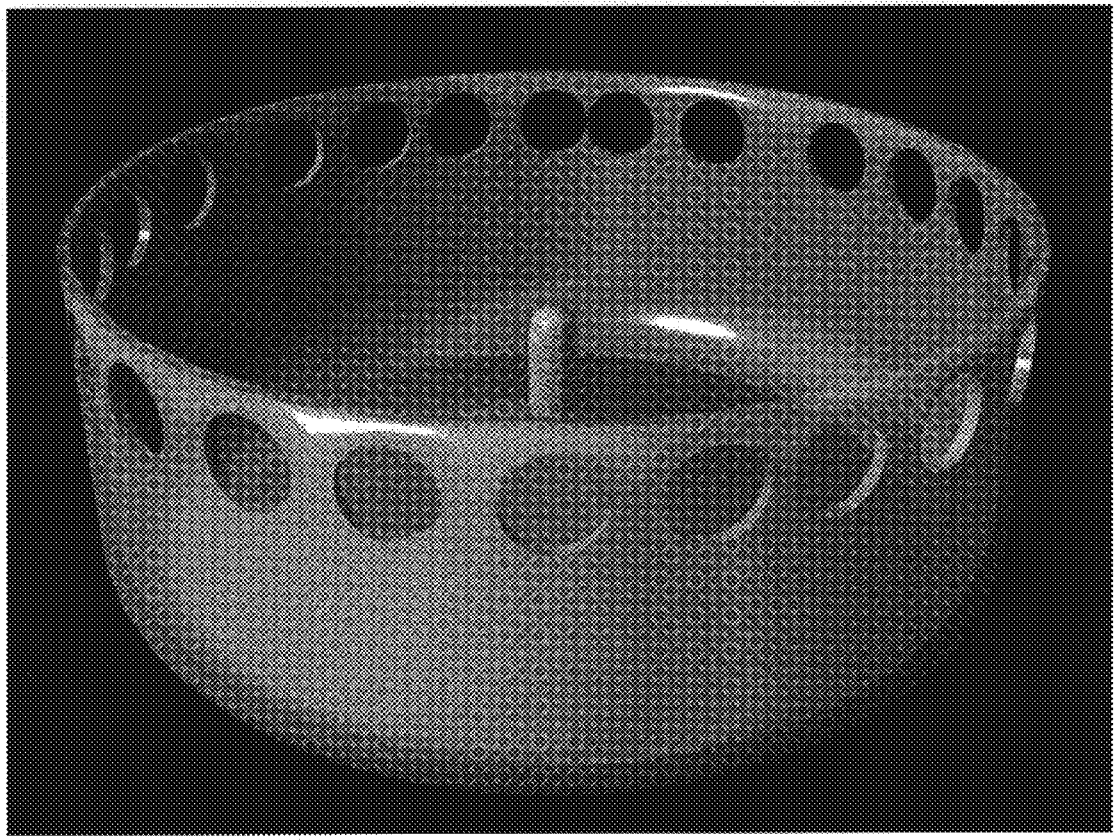
FIG. 6: Perspective of Lower Cylinder, D
Figure 7:
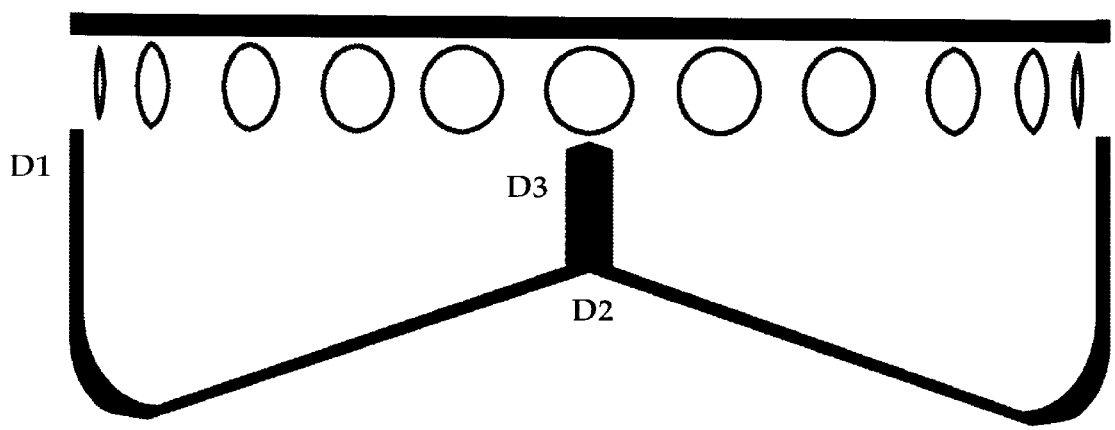
FIG. 7: Front view of Lower Cylinder, D

The Side Pocket C4 has tiny holes in its upper section allowing the water in it to seek its own level without being affected by any turbulence Lower Cylinder D FIG. 6 and FIG. 7

D1: The Lower Cylinder D has holes perforated in the upper part of the circular wall. The holes allow the intake of the unfiltered air so it may flow through the water in the system.

D2: The conical shape of the base of the Lower Cylinder D enhances the flow of incoming unfiltered air.

D3: The bolt in the center of the base allows attachment to the Upper Cylinder C by way of a nut that is attached to the bolt in the Upper Cylinder C.

Figure 8:
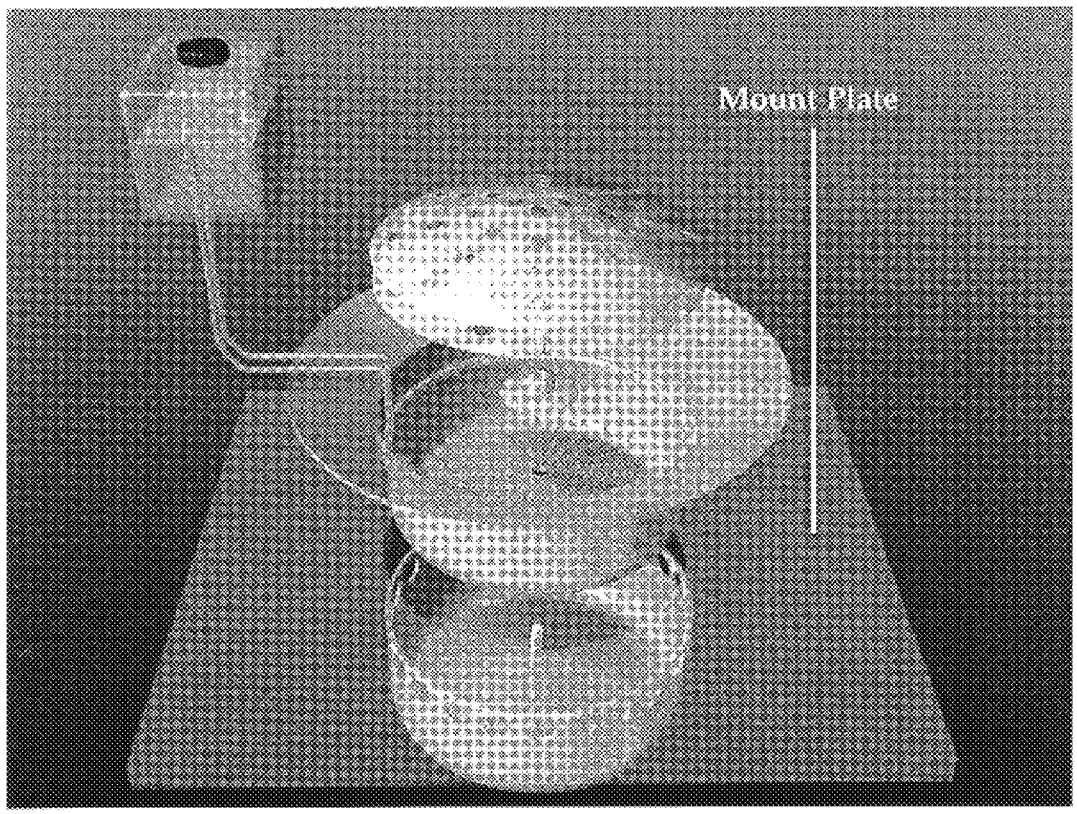
FIG. 8: Perspective of Aqua Air-Filter Device, ready for insertion into Mount Plate
Figure 9:
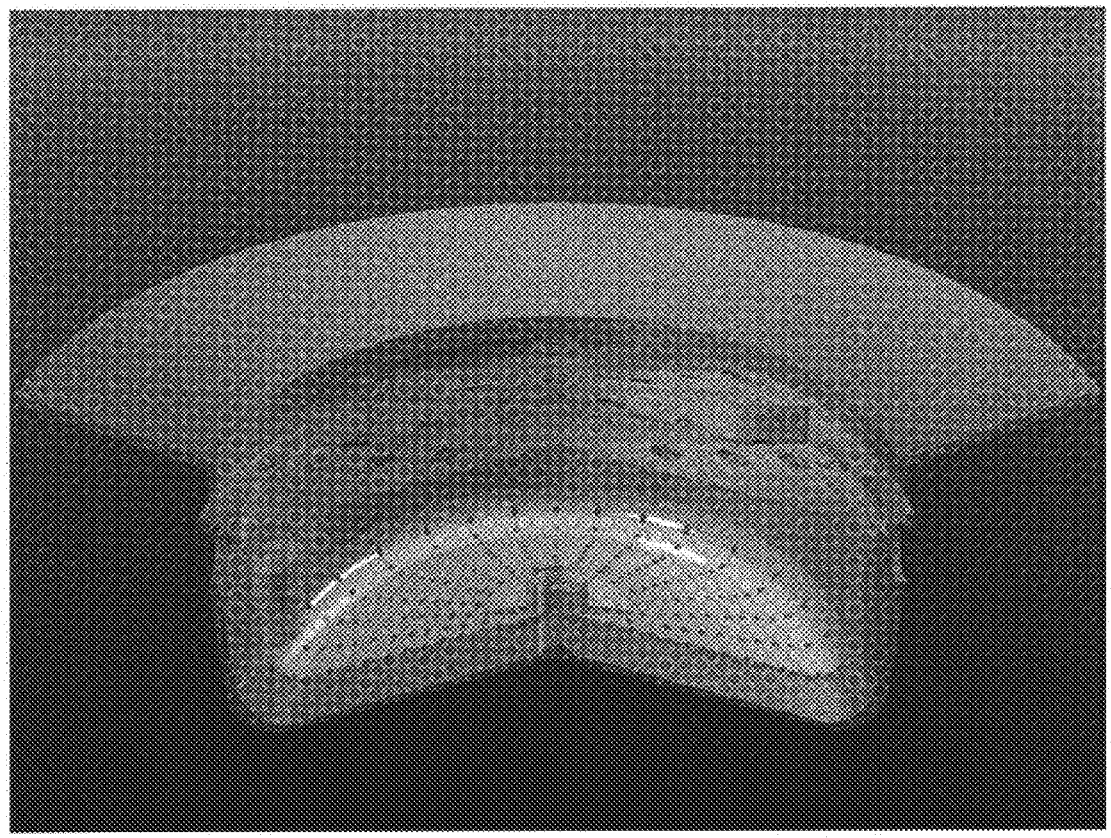
FIG. 9: Cut away drawing of Aqua Air-Filter Device with all components assembled
Figure 10:
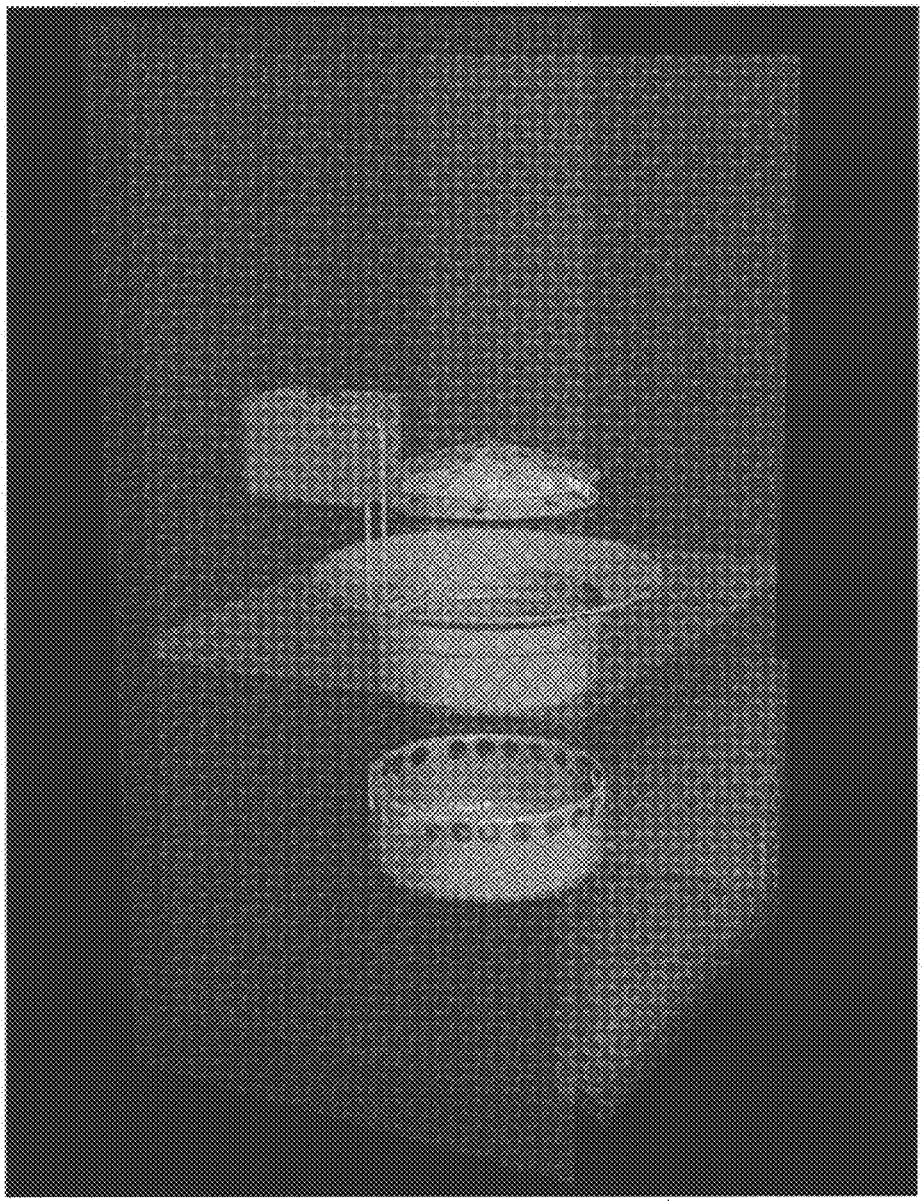
FIG. 10: Perspective of components of Aqua Air-Filter Device ready for installation in a standard heating and airconditioning system
Figure 11:
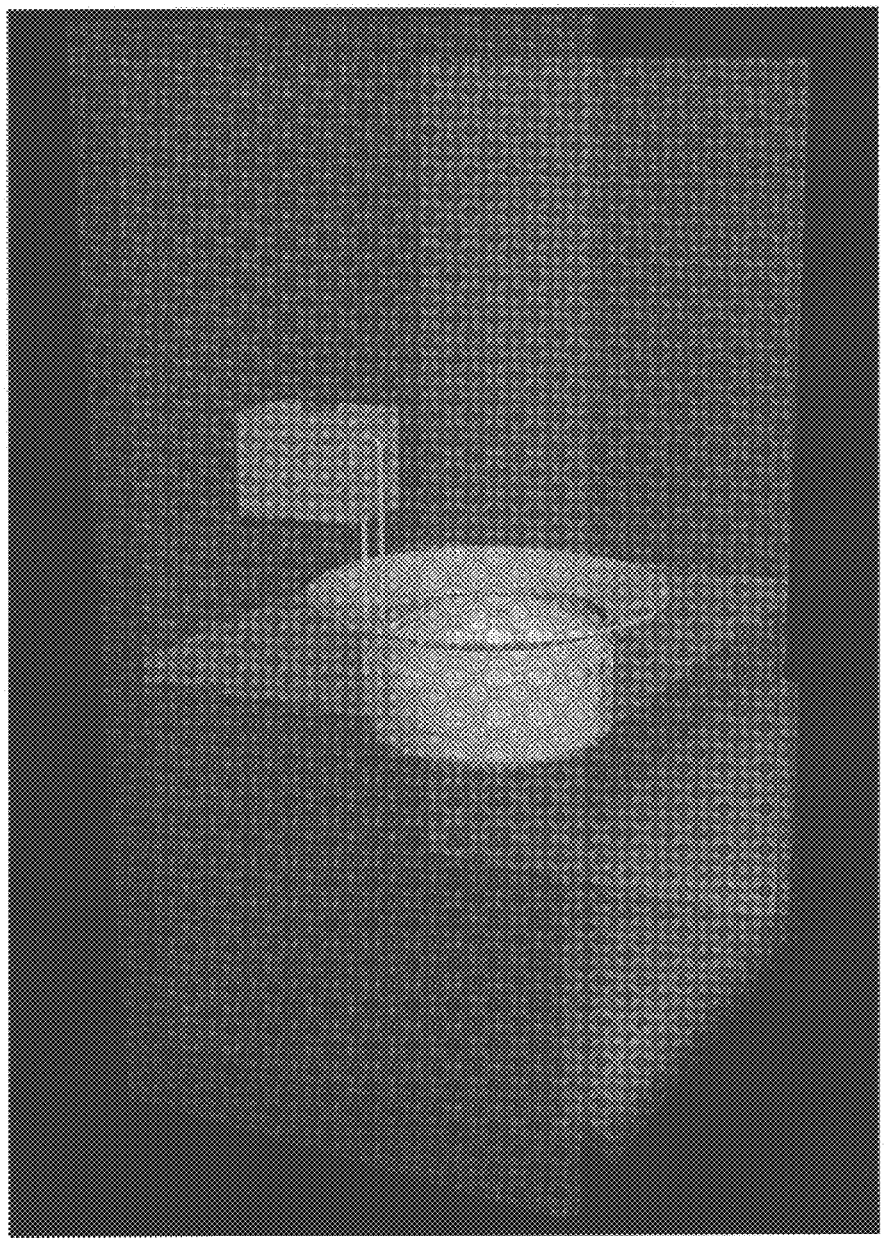
FIG. 11: Perspective of Aqua Air-Filter Device installed in a standard heating and airconditioning system.

Mount Plate FIG. 8

The Mount Plate is made of rigid plastic. The Lower Cylinder D goes below the Mount Plate. The rest of the system goes above. The Upper Cylinder C is inserted into the Lower Cylinder D and both cylinders are bolted together. The system is now ready for installation in a standard heating and airconditioning system, replacing the conventional filter of today.

What I claim is:

1. A method of filtering dust, dust mites, bacteria, pollutants, and other particulate matter from an incoming air flow in residential and commercial heating and air conditioning systems, comprising passing the incoming air flow through an aqua air filter located in a location within a furnace where conventional furnace filters are located, the aqua air filter comprised of a small upper cylinder with several holes perforated in the base of the cylinder, a large lower cylinder having a solid base with holes perforated in an upper part of the large lower cylinder wall and a hole in the center of the solid base, the small upper cylinder and large lower cylinder adapted to hold a water and paraffin bath, a bolt within the hole of the base of the large lower cylinder, the bolt made of the same material as the cylinders, a damper comprised of two cone-shaped units perforated with a series of holes, the holes in the first cone-shaped unit offset from the holes in the second cone-shaped unit, the damper sitting on top of the small upper cylinder to prevent splashing of water, a plastic nut attached to the bolt of the lower cylinder so that the upper and lower cylinders are attached, a holding plate with a hole in the plate which accommodates the two cylinders within the furnace, and an external water reservoir connected to the aqua air filter by an air pipe and a water pipe, one end of the air pipe and water pipe connected to the wall of the upper small cylinder and the other end of the air pipe and water pipe connected to the external water reservoir, the external water reservoir designed to maintain proper water level in the aqua air filter.

* * * * *